US006822971B1

United States Patent
Mikkonen (10) Patent No.: US 6,822,971 B1
(45) Date of Patent: Nov. 23, 2004

(54) APPARATUS, AND ASSOCIATION METHOD, FOR IDENTIFYING DATA WITH AN ADDRESS

(75) Inventor: Jouni Mikkonen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/322,462

(22) Filed: May 28, 1999

(51) Int. Cl.[7] .................................................. H04J 3/24
(52) U.S. Cl. ..................................... 370/475; 455/558
(58) Field of Search ................................ 370/352, 471, 370/474, 475, 401; 455/461, 558, 557, 575.1

(56) References Cited

U.S. PATENT DOCUMENTS

| | | | | |
|---|---|---|---|---|
| 5,572,528 A | * | 11/1996 | Shuen | 370/402 |
| 5,729,537 A | * | 3/1998 | Billstrom | 70/349 |
| 5,862,345 A | * | 1/1999 | Okanoue et al. | 709/238 |
| 5,903,559 A | * | 5/1999 | Acharya et al. | 370/355 |
| 5,956,331 A | * | 9/1999 | Rautiola et al. | 370/338 |

FOREIGN PATENT DOCUMENTS

| | | |
|---|---|---|
| EP | 1 059 791 | 12/2000 |
| WO | WO 98/15106 | 4/1998 |
| WO | WO 98/57474 | 12/1998 |

OTHER PUBLICATIONS

C. Perkins, "RFC 2002: IP Mobility Support," RFC 2002, Oct., 1996, XP002123919 (Abstract), pp. 1–79.

* cited by examiner

Primary Examiner—Chi Pham
Assistant Examiner—Keith M. George (57) ABSTRACT

A module, and associated method, is engageable with a data terminal. The module includes a storage element for storing an identifier address, used to identify the origin of a packet of data. The module can be released out of positioning at a first data terminal and thereafter utilized at a second data terminal. Thereby, mobility of communications is increased as a user of successive data terminals can identify each successive data terminal with the same identifier.

14 Claims, 6 Drawing Sheets

APPARATUS, AND ASSOCIATION METHOD, FOR IDENTIFYING DATA WITH AN ADDRESS

The present invention relates generally to the communication of data, such as packet data, by a data terminal. More particularly, the present invention relates to apparatus, and an associated method, by which to identify the data terminal with an identifier address, such as an IP (internet protocol) address from which the data is communicated. The identifier address is stored on a storage element of a module which is releasably engageable with the data terminal. Improved mobility is provided as the identifier address becomes user-specific. That is, the user is able to engage the storage element with any selected data terminal to identify the selected data terminal and the data communicated therefrom, with the identifier address.

BACKGROUND OF THE INVENTION

Advancements in communication technologies have permitted the introduction of, and commercialization of, both new and improved types of communication systems.

A packet data communication system is exemplary of a communication system made possible as a result of such technological advancements. In a packet communication system, groups of digital bits are formatted into packets to form packets of data. The packets of data are communicated by a data terminal, either individually or in groups, at discrete intervals to a correspondent entity, such as another data terminal. Once received at the correspondent entity, the packets of data are concatenated together to recreate the informational content of the digital bits of which the packets are formed.

Because packets of data can be communicated at discrete intervals, the communication channel upon which the packet is transmitted need not be dedicated to a single communication pair. Instead, a shared communication channel can be used by a plurality of communication pairs to communicate packets of data on the shared channel.

Packet communication systems have been implemented in both conventional wireline, as well as wireless form. GPRS (general packet radio service) of the GSM (global system for mobile communications) cellular communication system is exemplary of a wireless packet communication system. And, most communications referred to as Internet communications, as well as communications in many local networks, are also effectuated by the communication of packet data.

Standardized protocols by which to format and to communicate packets of data have been developed by which to format and communicate packet data. A TCP/IP (transmission control protocol/internet protocol) protocol scheme is an exemplary packet formatting scheme. An X.25 protocol describes another exemplary protocol scheme.

Many different types of services have been implemented utilizing packet data communications. In some packet communication systems, each packet of data received at a correspondent entity is acknowledged with a feedback acknowledgment. And, in some packet communication systems, two-way packet communications are permitted.

Multi-media services, such as voice over IP (VoIP), permit multi-media communications to be effectuated through the communication of packet data. Mobility management is required to effectuate multi-media services.

Messaging services, for example, which permit user-to-user communication between subscribers of such services can be effectuated through the communication of packet data. Electronic mail or facsimile mail are exemplary of messaging services. Such services utilize storage units with store-and-forward mailboxing, sometimes together with message handling, such as information editing, processing, and conversion functions.

Certain retrieval services can also be effectuated through packet data communications. Such services provide the capability of accessing information stored in database centers. Information stored at such database centers is communicated to a subscriber of such services upon request by the subscriber. Retrieval services provided pursuant to the World Wide Web (www) of the internet is exemplary of a retrieval service.

Tele-action services similarly can also be effectuated by packet data communications. Tele-action services are characterized, typically by low data-volume transactions. Credit card validations, lottery transactions, utility meter readings, and electronic monitoring and surveillance system communications are all exemplary of tele-action services.

Distribution services can also be effectuated by packet data communications. Such services are characterized by a uni-directional flow of data from a network location to multiple numbers of other locations. News, weather, and traffic reports and product or service advertisements are exemplary of such distribution services.

Certain conversational services can also be effectuated by packet data communications. Conversational services provide bi-directional communication by means of real-time and end-to-end information transfer between subscribers to such services. A TELNET™ application is exemplary of such a service.

Certain dispatching services are also exemplary of bi-directional services which can be effectuated by packet data communications. Such services are characterized by the bi-directional flow of information from a network location, e.g., a dispatcher, and other users. Taxi and public utility fleet services are exemplary of such dispatching services. Conferencing services are yet additional types of services which can be effectuated through packet data communications. Such conferencing services provide multi-directional communication by means of real-time information transfer between multiple users.

Many of these services, as well as others, can be effectuated by way of an Internet backbone. A standard protocol by which to communicate packet data by way of the Internet is the TCP/IP protocol, noted briefly above.

In an IP protocol, the data terminal from which a packet of data is communicated is identified with an IP (Internet protocol) address as part of the header portion of the packet of data. The IP address is conventionally fixed at the data terminal. That is to say, the IP address is configured into a TCP/IP stack of the data terminal. The stack is typically part of an operating system, such as a Windows™ or UniX™, pursuant to which the data terminal might be operable. A user of a data terminal to perform a data service using packet communications might, however, utilize various data terminals over a period of time, such as throughout a work day at various work locations. Addressing information related to the packet communications at a first data terminal does not follow the user to a subsequently-used data terminal as the IP address. Communication mobility is therefore limited.

If a manner could be provided by which to permit an IP address, or other identifier, to roam with a user and to be used to identify any selected data terminal, improved mobility of packet data communications would be provided.

It is in light of this background information related to packet communications that the significant improvements of the present invention have evolved.

SUMMARY OF THE INVENTION

The present invention, accordingly, advantageously provides apparatus, and an associated method, for providing an IP address, or other identifier address, by which to identify a data terminal from which a packet of data is communicated. Operation of an embodiment of the present invention increases communication mobility as the IP address, or other identifier address, can be utilized at a data terminal selected by the user. If the user utilizes a successive series of data terminals, the identifier address is used at each successive data terminal. Addressing information provided by the identifier address thereby follows, or roams, with the user of the data terminals.

In one aspect of the present invention, a storage element is carryable by a user. The storage element includes a storage location at which an identifier address, such as an IP address, is stored. The storage element, in an exemplary implementation, is supported at an adaptor which is releasably engageable to a data terminal. When engaged with the data terminal, the contents of the storage location of the storage element is accessible to the data terminal to retrieve the value of the identifier address stored at the storage location. The value of the identifier address retrieved from the storage location is utilized by the data terminal when formatting packet data to be communicated by the data terminal.

In another aspect of the present invention, a module, also referred to as a smart card, is provided. The module is formed of a storage element positioned at a card member. The storage element includes storage locations at which an identifier address is stored. The card is insertable into a corresponding port of a data terminal. The card is releasably engageable with the port by the operation of inserting the card into the port to engage the card therewith and removing the card out of the port to release the card out of the engagement therewith. Subsequent to positioning of the card at the port of the data terminal, the data terminal is "booted" by execution of a boot strap program at the data terminal. During execution of the boot strap program, a value of the IP address stored at the storage element positioned together with the card is accessed and retrieved. The identifier address is retrieved and configured into a TCP/IP stack, thereafter to be utilized to form a portion of the header of a packet of data generated during operation of the data terminal.

Because the module is, in an exemplary implementation, releasable out of engagement with the data terminal, the identifier address contained thereat need not be used to identify only a single data terminal. That is to say, merely by removing the module out of the port of a first data terminal and subsequently inserting the module into the port of another data terminal, the other of the data terminal can be identified with the identifier stored at the storage element of the module. Improved user mobility is thereby provided as multiple platforms, provided with the same identity can be successively used by user.

In another aspect of the present invention, a manner is provided by which to identify a data terminal with an identifier to identify the origin of packet data. An identifier address is stored at a storage element which is releasably engageable with the data terminal. The identifier address is retrieved from the storage element and used to identify the origin of packet data communicated by the data terminal. Because the storage element is releasably engageable with the data terminal, the storage element can be released out of its engagement with the data terminal and thereafter engaged with another data terminal to identify the subsequently-engaged data terminal with the identifier.

In yet another aspect of the present invention, a manner is provided by which to permit a user of a data terminal in a visited sub-network to communicate packet data with a correspondent entity positioned in another sub-network. Again, the user attaches a portable storage element to the data terminal connected to the visited sub-network. The storage element includes an identifier which is used to identify the data terminal and, therefrom, packets of data communicated by the data terminal to the correspondent entity. When in the visited sub-network, the data terminal is first caused to register with the foreign agent of the visited sub-network. The foreign agent is connected to an internet backbone and is formed of, for example, a data router. The registration information of the data terminal connected in the visited sub-network is then communicated to a home agent of the user's home sub-network. Thereafter, packet data can be communicated between the data terminal and the correspondent entity. Data communicated by the correspondent entity and communicated to the data terminal is routed by way of the home agent of the user's home network. Thereby, packet data is communicated to the data terminal without the correspondent entity requiring knowledge of the location of the data terminal.

In these and other aspects, therefore, apparatus, and an associated method, is provided for identifying a first data terminal in a data communication system operable to communicate a packet of data. A storage device has a storage location for storing an identifier. A supportive adaptor supports the storage device with the first data terminal. When engaged at the first data terminal, and the packet of data is to be communicated, a value of the identifier is stored at the storage location of the storage device is obtained from the storage location and formatted together with the packet of data to identify the first data terminal with the value of the identifier.

A more complete appreciation of the present invention and the scope thereof can be obtained from the accompanying drawings which are briefly summarized below, the following detailed description of the presently preferred embodiments of the invention, and the appended claims.

DETAILED DESCRIPTION

Figure 1:
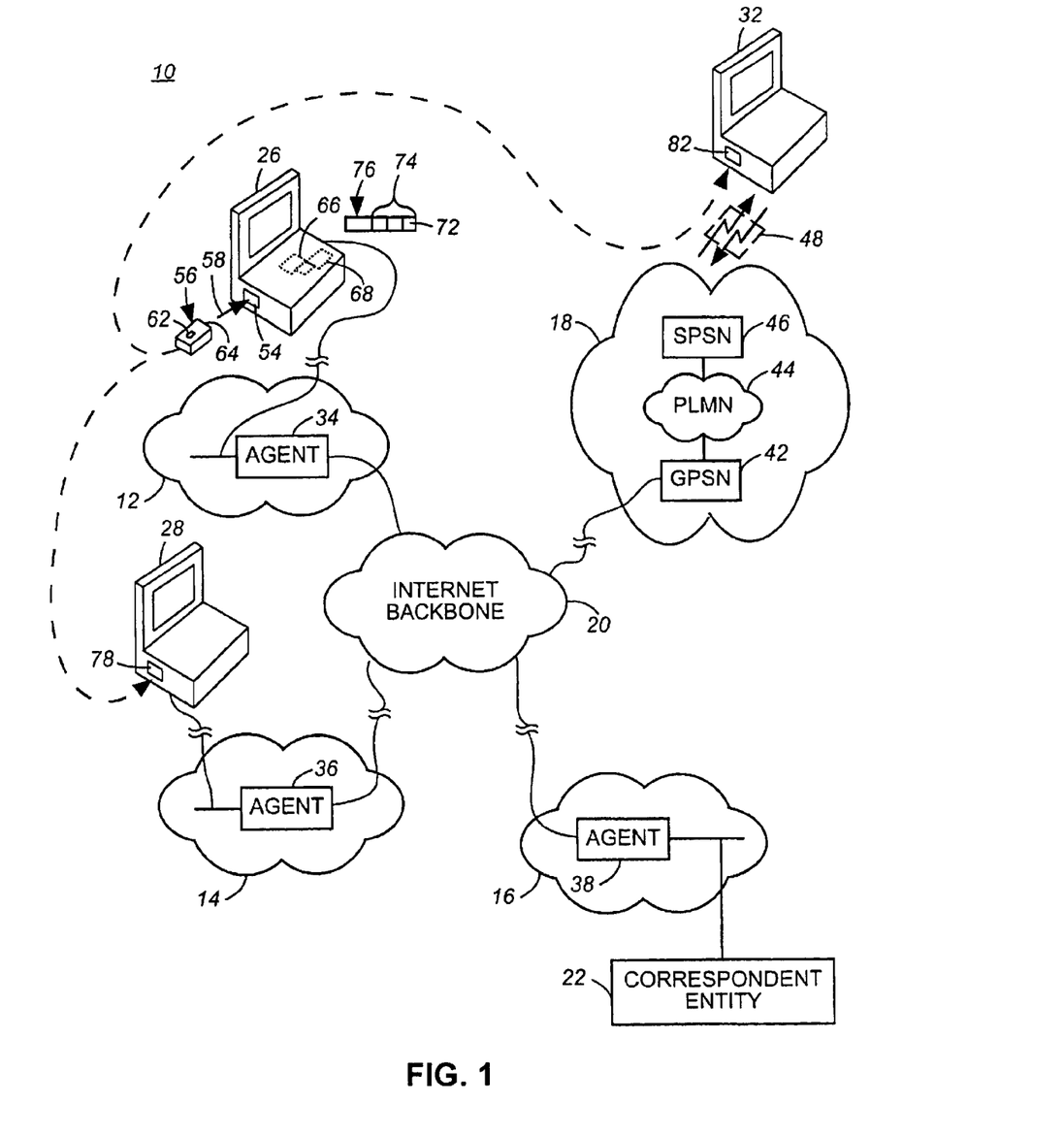
FIG. 1 illustrates a functional block diagram of a packet communication system in which an exemplary embodiment of the present invention is operable.

Referring first to FIG. 1, a packet communication system, shown generally at 10, provides for the communication of packet data pursuant to an embodiment of the present invention. The system 10 is here shown to include a plurality of sub-networks, of which sub-networks 12, 14, 16, and 18 are separately shown in the Figure. For purposes of illustration, the sub-networks 12, 14, and 16 form wireline sub-networks, and the sub-network 18 forms a wireless sub-network. Other arrangements can analogously be shown, and the arrangement of the system 10 shown in the Figure is exemplary only. The sub-networks 12–18 are connected to an internet backbone 20 and, in turn, connected to each other therethrough.

During operation of the communication system 10, packet data is communicated between data terminals. For purposes of describing operation of various embodiments of the present invention, communication of the packet data between communication pairs formed of a correspondent entity 22 connected to the sub-network 16 and various data terminals connected to the other sub-networks 12, 14, and 18, shall be described.

For instance, a packet of data formed at the data terminal 26 connected to the sub-network 12 is communicated to the correspondent entity 22 during operation of an embodiment of the present invention. Also, during operation of an embodiment of the present invention, a packet of data formed at the data terminal 28 is communicated to the correspondent entity 22. The data terminal 28 is connected to the sub-network 14. And, also during operation of an embodiment of the present invention, a packet of data formed at the data terminal 32 is communicated to the correspondent entity 22. The correspondent entity is analogously also operable to form packet data which can be communicated to a selected one or more of the data terminals 26–32.

The sub-networks 12, 14, and 16, include agents 34, 36, and 38 respectively, each comprised of, for instance, packet data routers. The agents 34-38 further function, in conventional manner, as firewall devices for the respective sub-networks of which the agents form portions. The sub-network 18, a wireless sub-network, is here shown to include a GPSN (gateway packet switch node) 42, coupled to a PLMN (public land mobile network) 44 which, in turn, is coupled to an SPSN (serving packet switch node) 46. The data terminal 32 is coupled to the SPSN 46 by way of a radio link 48. While not separately shown, the data terminal includes a radio modem, or the like, to permit connection to the SPSN radio link 48.

In the exemplary implementation, the data terminal 26 forms a laptop computing device and includes a port 54. A module 56 is releasably engageable with the port 54 by translation of the module in the direction of the arrow 58 shown in the Figure. Once engaged with the data terminal, the module 56 can be released therefrom by translating the module in the direction reverse to that of the arrow 58. In an exemplary implementation, the module 56 forms a PCMCIA card and the port 54 frms a PCMCIA port. While not separately shown, in another embodiment, the module 56 forms a WLAN card, or the like, and the port 54 forms a computer backplane slot.

The module 56 includes a storage element 62 containing storage locations. The storage element 62, in an exemplary implementation, is formed of a non-volatile memory. In other implementations, the storage element is of another type of memory. The module 56 further includes an adaptor 64 to permit connection of the module to the data terminal 26, in otherwise conventional manner, when the module is engaged at the port 54. In an implementation in which the module 56 forms a PCMCIA card, the adaptor 64 forms a PCMCIA card mateable with a PCMCIA port. In another embodiment in which a WLAN card is utilized, the WLAN card is embodied as a PCMCIA card, also mateable with a PCMCIA port.

In other embodiments, the storage element is connected to the data terminals in other manners, such as by way of a serial, or other, port of the data terminal. And, more generally, the storage element can be connected to .the data terminal in any manner, including directly, wherein the data terminal itself provides the functionality of the module 56.

The storage location of the storage element 62 stores a value of an identifier address, here an IP (Internet protocol) address, thereat. When the module 56 is engaged at the port of the data terminal 26, the storage locations of the storage element 62 are accessible by the CPU (central processing unit) 66 of the data terminal. During booting of the data terminal, i.e., execution of a boot strap program 68 by the CPU, the value of the identifier stored at the storage locations of the storage element 62 is retrieved. The identifier is thereafter utilized at the data terminal to identify the origin of a packet of data generated by the data terminal. In the exemplary implementation in which the communication system 10 is operable pursuant to IP protocols, the identifier address forms an IP address and is used to identify the origin of the packet of data, inserted as a part 72 of the header portion 74 of a packet 76 generated by the data terminal.

Because the module 56 is releasable out of engagement with the data terminal 26, a user of the data terminal 26, subsequent to use of such data terminal, can carry or otherwise move, the module 56 to another data terminal, such as the data terminal 28, connected to the sub-network 14. The data terminal 28 also includes a port, here shown at 78. The module 56 is engageable also with the data terminal 28 to permit the data terminal 28 to access the identifier stored at the storage locations of the storage element 62 thereof. In a manner analogous to that described with respect to operation of the data terminal 26, the data terminal 28 is also operable to utilize the identifier to identify packet data originated at the data terminal 28. Thereby, the IP, or other, identity is not fixed at a single data terminal, but is mobile with the user. The data terminal 32 also includes a port, shown at 82, and the data terminal 32 is also identifiable, and packet data communicated therefrom, is identified with the value of the identifier stored at the storage locations of the storage element of the module 56. Again, in an exemplary implementation, the module 56 forms a PCMICIA card, and the ports 78 and 82 form PCMCIA ports. In another implementation, the module 56 forms a card member and the ports 78 and 82 form slots in back planes of the respective terminals. Other arrangements are analogously possible.

FIG. 2 illustrates again the data terminal 26 shown in FIG. 1, together with the module 56. Here, the storage locations of the storage element 62 form a database, here having, in addition to the identifier address 86, name indicia 88 and security keys 92. The contents of the storage locations of the storage element 62, as noted previously, are accessible by way of a bus 94. The layers of a TCP/IP stack 96 of which the data terminal 26 can be represented, are shown to include an upper-level layer 98, such as a TELNET™, FTP™, HTTP, PING, etc., layer. An RSVP layer 102 is represented beneath the layer 98, above the TCP, UDP, and RTP layers 104. At the same layer-level 104, ICMP and M layers are also provided. An IP layer 106 is formed therebeneath. And, a physical link layer 108 is positioned beneath the IP layer 106. The link layer 108 at the wireless data terminal 32 (shown in FIG. 1) also forms a wireless link layer of the layer 108.

Because the module 56 is releasable out of engagement with the data terminal 26, thereafter to be engageable with another data terminal, thereby to permit a single user to utilize multiple data terminals, or other platforms, while using the same identity at the different terminals.

Figure 2:
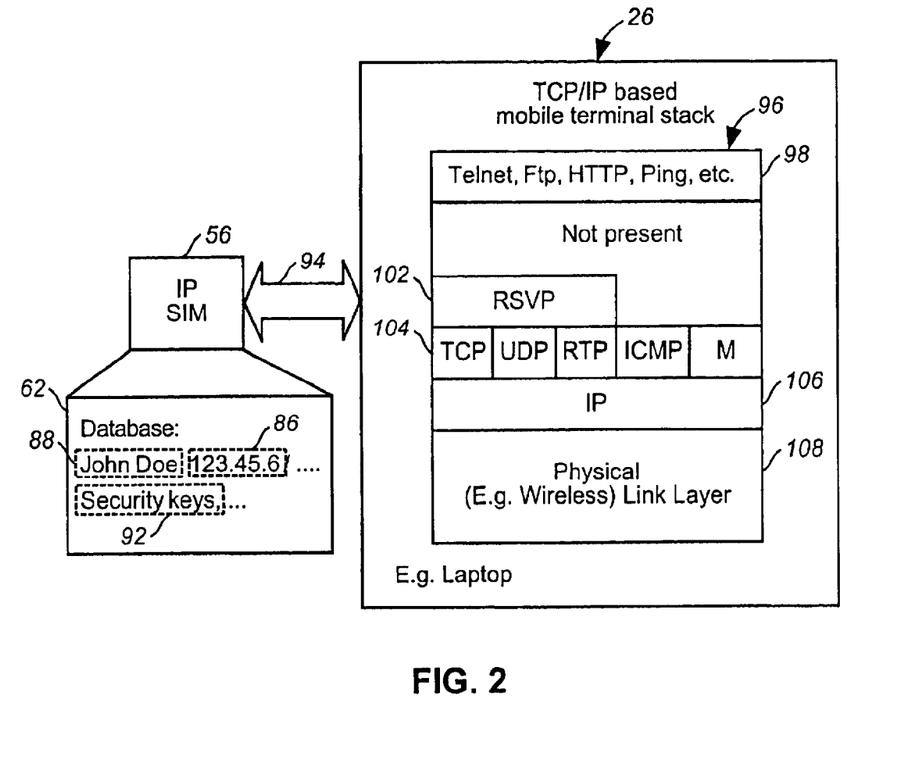
FIG. 2 illustrates a functional block diagram of a data terminal and a module, shown in FIG. 1, and forming an exemplary embodiment of the present invention.
Figure 3:
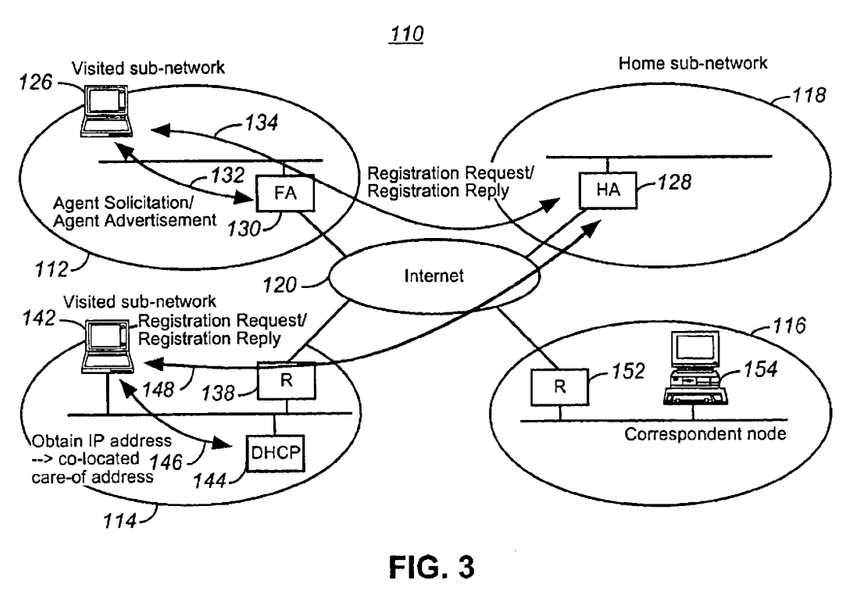
FIG. 3 illustrates a functional block diagram of a packet communication system, analogous to that shown in FIG. 1, and here illustrating the procedures pursuant to which registration of a data terminal is effectuated during operation of an exemplary embodiment of the present invention, operable pursuant to an IPv4 protocol.

FIG. 3 illustrates a packet communication system 110, analogous to the communication system 10, shown in FIG. 1. The system is here shown to operate pursuant to IPv4 protocols. Details of such protocols are more fully set forth in the RFC2002 for IPv4. Here, four sub-networks, sub-networks 112, 114, 116, and 118, are shown, each connected to an internet backbone 120. In exemplary operation of the communication system, a data terminal 126 is positioned at the sub-network 112. While not separately shown, a module, analogous to the module 56, shown in FIGS. 1–2, is releasably engaged with the terminal 126. The home sub-network associated with the identifier stored at the module is here the sub-network 118. And, the sub-network includes a home agent (HA) 128 connecting the internet backbone 120 with the nodes of the sub-network. A foreign agent (FA) 130 connects the internet backbone with the nodes of the sub-network 112.

First, and as indicated by the segment 132, the address of the foreign agent 130 is determined by the data terminal 126, and the data terminal 126 is registered at the foreign agent. Such procedure is here referred to as agent solicitation/agent advertisement. Then, and as indicated by the segment 134, registration information is communicated back to the home agent 128 of the home sub-network 118.

FIG. 3 further illustrates a router 138 connecting the internet backbone 120 to nodes of the visited sub-network 114. And, a data terminal 142 is coupled to a node of the sub-network. Here, the sub-network further includes a DHCP (dynamic host configuration protocol) device 144. The DHP is used only for co-located COA (care-of addresses). In this arrangement, the data terminal 142 first accesses the DHCP, here indicated by the segment 146 to obtain the IP address and co-located care-of address stored thereat. Thereafter, and as indicated by the segment 148, registration is made to the home agent 128.

The Figure further includes a router 152 connecting the internet backbone with nodes of the sub-network 116. A correspondent entity, also known as a correspondent node 154, is positioned at the sub-network 116. Subsequent to registration, packet communications are effectuated with the correspondent node 154.

Figure 4:
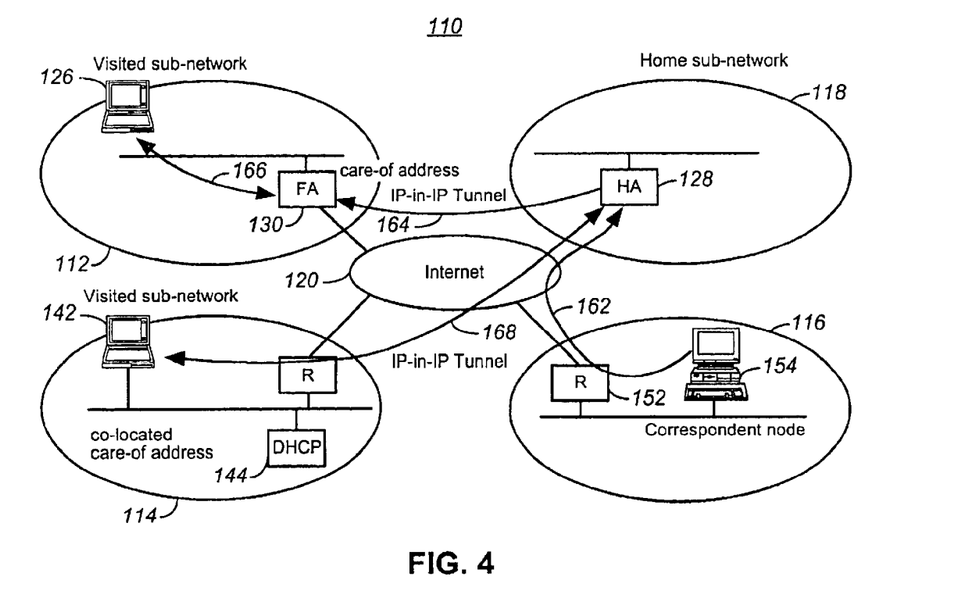
FIG. 4 illustrates a functional block diagram of a packet communication system, similar to that shown in FIG. 3, but here illustrating the procedures pursuant to which packet data communication is effectuated during operation of an exemplary embodiment of the present invention, operable pursuant to the IPv4 protocol.

FIG. 4 then shows the packet communication system shown in FIG. 3. The elements of the communication system are referenced corresponding to the designations used in FIG. 3. FIG. 4 illustrates the process of data flow subsequent to registration of the data terminals 126 and 142. When a user is positioned at the data terminal 126, the correspondent node 154 communicates packet data to the data terminal by routing packets of data to the home agent 128. Such routing is indicated by the segment 162. An IP-in-IP tunnel is formed between the home agent 128 and the foreign agent 130, here indicated by the line segment 164, thereafter to route the data from the home agent to the foreign agent, and the care-of address which identifies the foreign agent. The data is then routed to the data terminal 126, here designated by the line segment 166.

When the data is to be communicated by the correspondent node to the data terminal 142, the data is routed by the correspondent node to the home agent 128, indicated also by the line segment 162. Thereafter, an IP-in-IP tunnel is formed between the home agent 128 and the data terminal 142, here indicated by the line segment 168. Thereby, routing of data is effectuated without the correspondent node knowing of the actual location of the data terminal.

Figure 5:
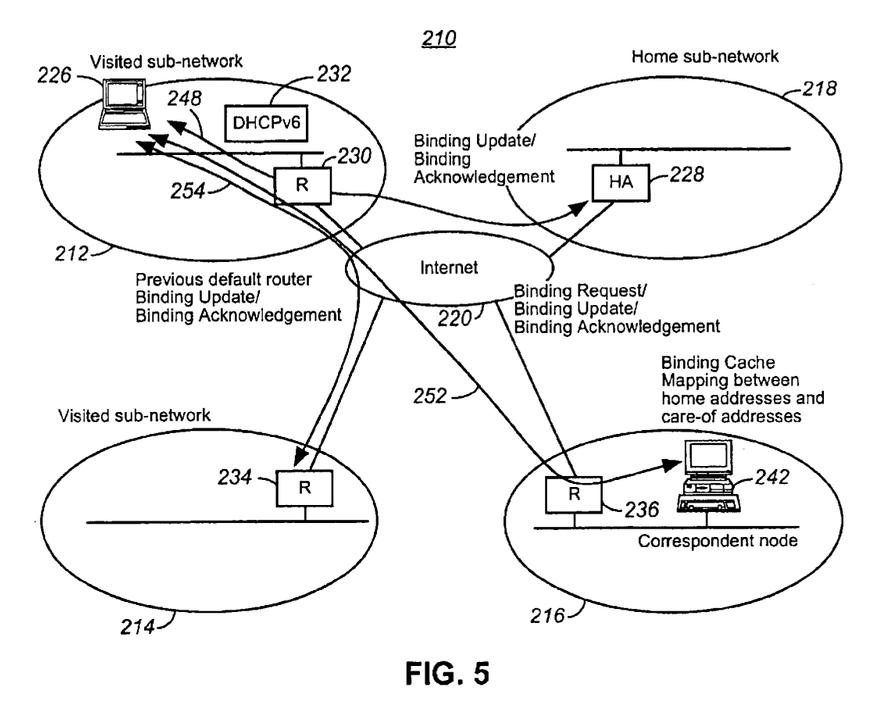
FIG. 5 illustrates a functional block diagram of a packet communication system, analogous to that shown in FIG. 1, and here illustrating the procedures pursuant to which registration of a data terminal is effectuated during operation of another exemplary embodiment of the present invention, operable pursuant to an IPv6 protocol.

FIG. 5 illustrates a packet communication system 210, here shown to include sub-networks 212, 214, 216, and 218. The system is here shown to operate pursuant to IPv6 protocols. The sub-networks are connected to an internet backbone 220. And, data terminal 226 is connected to the sub-network 212. Again, while not separately shown, a module, analogous to the module 56 shown in FIGS. 1–2, is releasably engaged with the data terminal. The sub-network 212 forms a visited sub-network and the sub-network 218 forms a home sub-network.

A home agent(HA) 228 connects the internet backbone with the nodes of the sub-network 218. And, a router 230, connects the internet backbone with the nodes of the sub-network 212. The sub-network 212 is further shown to include a DHCPv6 232. A router 234 is further shown to connect the internet backbone with the nodes of the sub-network 214, and a router 236 is shown to connect the internet backbone to the nodes of the sub-network 216. A correspondent entity 242, also known as a correspondent node, is connected to the sub-network 216.

When the user of the data terminal 226 causes the data terminal to register itself, a binding update/binding acknowledgment is routed between the data terminal and the home agent 228. Such routing is indicated in the Figure by the segment 248. The binding update and acknowledgment is routed by way of the router 230. A binding request/binding update/binding acknowledgment is also routed between the data terminal 226 and the correspondent node 242. Such routing is indicated in the Figure by the segment 252. And, segment 254 is further shown in the Figure. The segment 254 represents binding updates/binding acknowledgment messaging between the data terminal 226 and the router 234. The router 234 here represents a previous default router. In the binding messages, IP SEC is used to provide authentication. The paths 248, 252, and 254 define different communication possibilities. Initially, the data path is started via the home agent 228, indicated by the segment 248. In IPv6, it is possible to do route optimization without a correspondent node knowing the physical location of the roaming node, here the data terminal 226, here forming the segment 252. And, if packets are transient while the data terminal becomes re-registered, the packets can be forwarded, as needed, indicated by the segment 254.

Figure 6:
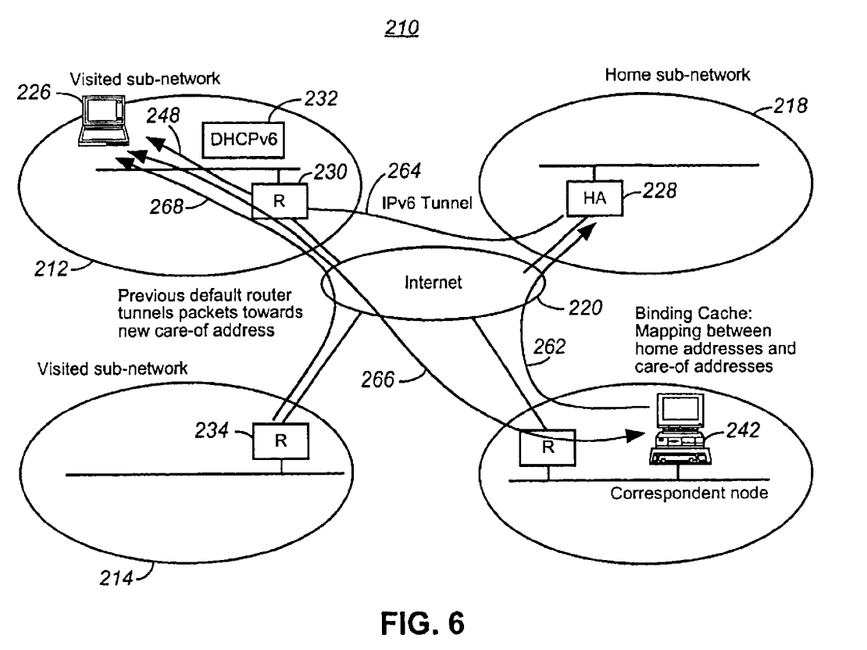
FIG. 6 illustrates a functional block diagram of the packet communication system shown in FIG. 5, but here illustrating the procedures pursuant to which packet data communication is effectuated during operation of another exemplary embodiment of the present invention, operable pursuant to the IPv6 protocol.

FIG. 6 illustrates again the packet communication system 210. Elements previously shown to form portions of the communication system in FIG. 5 are commonly referenced in FIG. 6. FIG. 6 illustrates data flow of data during operation subsequent to registration of the data terminal 226 shown in FIG. 5.

Here, when data is to be communicated by the correspondent node 242 to the data terminal 226, several communication paths are possible. In one path, data is first routed to the home agent 228. Such routing is indicated in the Figure by the line segment 262. Thereafter, an IPv6 tunnel is formed between the home agent and the data terminal. Such tunnel formation and routing of data to the data terminal is indicated in the Figure by the segment 264. Data is also communicated between the data terminal 226 and the correspondent entity 242 by the routing indicated by the segment 266. Here, the location of the correspondent node 242 is known and routing of data thereto is direct. Reverse-direction data requires an IPv6 specific binding update. And, FIG. 6 further shows segment 268. The segment 268 is representative of tunneling of packet data towards a new care-of address from the router 234 which forms here, a previous default router.

Through operation of an embodiment of the present invention, a module containing an IP address, or other identifier, is releasably engageable with a data terminal. The module is carryable by a user to permit the user to communicate from a selected data terminal while using the same identifier at the different data terminals. A proved mobility of communications is thereby provided.

The previous descriptions are of preferred examples for implementing the invention and the scope of the invention should not necessarily be limited by this description. The scope of the present invention is defined by the following claims:

I claim:

1. In a data communication system having a first data terminal for communicating a first packet of data and at least a second data terminal also for communicating a second packet of data, the first data terminal selectably utilizable by a user and including a first processing device and a first adaptor port having electrical terminals disposed thereat and at least selectably connected to the processing device and the second data terminal also selectably utilizable by the user including a second processing device and a second adaptor port having electrical terminals disposed thereat and at least selectably connected to the second processing device, an improvement of apparatus for identifying the first data terminal, said apparatus comprising:

a portable storage device having a storage location for storing an identifier address the identifier address associated with the user, said storage device releasably engageable at any of the first data terminal and the at least the second data terminal such that, when engaged at the first data terminal and the first packet of data is to be communicated, a value of the identifier address stored at the storage location of said storage device is obtained therefrom and formatted together with the first packet of data to identify the first data terminal, and the first packet of data to be communicated therefrom, with the value of the identifier address and said portable storage device selectably released out of engagement at the first data terminal and engageable thereafter at the second data terminal such that, when engaged at the second data terminal and the second packet of data is to be communicated, the value of the identifier address stored at the storage location of said storage device is obtained therefrom and formatted together with the second packet of data to identify the second data terminal, and the second packet of data to be communicated therefrom with the value of the identifier address;

a supportive adaptor engaged with said storage device, thereby to permit engagement of said storage device at any of the first data terminal and the at least the second data terminal;

the supportive adaptor, together with said storage device engaged therewith, releasably received at the adaptor port of any of the first and at least second data terminals to electrically connect said storage device with the electrical terminals of any of the first adaptor port and the second adaptor port, thereby to permit the identifier address, stored at said portable storage device, to Dam with the user.

2. The apparatus of claim 1 wherein the first data terminal is for communicating the packet of data pursuant to an IP (Internet protocol) and wherein the identifier address stored at the storage location of said storage device comprises an IP address.

3. The apparatus of claim 1 wherein the adaptor port comprises a PCMCIA (Personal Computer Memory Card International Association) port and wherein said supportive adaptor comprises a PCMCIA card.

4. The apparatus of claim 1 wherein the first adaptor port comprises a computer back plane slot and wherein said supportive adaptor comprises a computer card pluggable into the computer back plane slot.

5. The apparatus of claim 1 wherein the first processing device is operable to execute a bootstrap program and wherein the value of the identifier stored at the storage location of sod storage device is retrieved during execution of the bootstrap program.

6. The apparatus of claim 5 wherein the first data terminal is operable to communicate the packet of data pursuant to a TCP/IP (Transmission Control Protocol/Internet Protocol) protocol, wherein the identifier address stored at the storage location of said storage device comprises an IP address, and wherein the first processing device is further operable to configure a TCP/IP stack utilizing the IP address retrieved from the storage location of said storage device.

7. The apparatus of claim 6 wherein the data communication system further comprises a home agent connected to an Internet backbone, wherein the first data terminal is further connected to the Internet backbone by way of a foreign agent, and wherein the first data terminal generates a registration request to register the first data terminal with the home agent, the registration request identifying the first data terminal with the IP address retrieved from the storage location of said storage device.

8. The apparatus of claim 7 wherein the data communication system further comprises a correspondent entity connected to the Internet backbone by way of a correspondent router and wherein the first packet of data communicated by the first data terminal, identified by the IP address, is communicated to the correspondent entity.

9. The apparatus of claim 8 wherein the correspondent entity is operable to generate a reply message, the reply message routed back to the first data terminal by way of the home agent.

10. The apparatus of claim 6 wherein the data communication system further comprises a home agent connected to an Internet backbone, wherein the first data terminal is further connected to the Internet backbone by way of a visited-network router and wherein the first data terminal generates a registration request to register the first data terminal with the home agent, the registration request identifying the first data terminal with the IP address retrieved from the storage location of said storage device.

11. In a method for communicating packet data in a data communication system having a first data terminal, the first data terminal selectably utilizable by a user and including a first processing device and a first adaptor port having electrical terminals disposed thereat and at least selectably connected to the first processing device, and at least a second data terminal also selectably utilizable by the user including a second processing device and a second adaptor port having electrical terminals disposed thereat and at least selectably connected to the second processing device, an improvement of a method for formatting the packet data with an identity of any of the first data terminal and the at least the second data terminal, said method comprising:

storing an identifier address at a portable storage device carriable by the user, the identifier address associated with the user;

supporting the portable storage device at the first data terminal when the user utilizes the first data terminal, the storage device containing the identifier address;

booting the first data terminal and retrieving the identifier address during booting of the first data terminal;

formatting the packet data generated at the first data terminal with the identifier to identify the first data terminal with the value of the identifier address; releasing the storage device out of support at the first data terminal;

supporting the storage device at the second data terminal when the user utilizes the second data terminal;

booting the second data terminal and retrieving the identifier address during booting of the second data terminal; and formatting the packet data generated at the second data terminal with the value of the identifier address.

12. The method of claim 11 wherein the packet data is communicated pursuant to IP (Internet protocol) and wherein the identifier stored at the storage device supported at the first data terminal during said first operation of supporting comprises an IP address.

13. The method of claim 12 wherein said operation of formatting comprises configuring the IP address in a TCP/IP stack.

14. The method of claim 11 wherein the first data terminal comprises a PCMCIA port and wherein the storage device supported during said operation of supporting is supported at the PCMCIA port.

* * * * *